United States Patent
Yamaguchi

(10) Patent No.: US 9,692,263 B2
(45) Date of Patent: Jun. 27, 2017

(54) STATOR CORE FOR ROTARY ELECTRIC MACHINE

(71) Applicant: AISIN AW CO., LTD., Anjo-shi, Aichi-ken (JP)

(72) Inventor: Yasuo Yamaguchi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 307 days.

(21) Appl. No.: 14/435,593

(22) PCT Filed: Dec. 6, 2013

(86) PCT No.: PCT/JP2013/082865
§ 371 (c)(1),
(2) Date: Apr. 14, 2015

(87) PCT Pub. No.: WO2014/097908
PCT Pub. Date: Jun. 26, 2014

(65) Prior Publication Data
US 2015/0303746 A1    Oct. 22, 2015

(30) Foreign Application Priority Data
Dec. 18, 2012  (JP) .................................. 2012-276007

(51) Int. Cl.
*H02K 1/06*    (2006.01)
*H02K 1/18*    (2006.01)
(Continued)

(52) U.S. Cl.
CPC ............... *H02K 1/185* (2013.01); *H02K 1/16* (2013.01); *H02K 21/14* (2013.01); *H02K 21/16* (2013.01); *H02K 2213/03* (2013.01)

(58) Field of Classification Search
CPC ........... H02K 1/16; H02K 1/148; H02K 1/146
(Continued)

(56) References Cited

U.S. PATENT DOCUMENTS 5,142,179 A * 8/1992 Nakamura ............... H02K 1/04
310/216.004
6,049,153 A    4/2000 Nishiyama et al.
(Continued)

FOREIGN PATENT DOCUMENTS

CN    102510181 A    6/2012
JP    H11-98793 A    4/1999
(Continued)

*Primary Examiner* — Thanh Lam
(74) *Attorney, Agent, or Firm* — Oliff PLC

(57) ABSTRACT

When a plurality of core plates are stacked and fixed to form a stator core for a rotary electric machine, fixation portions are set in accordance with the relative positional relationship with magnetic poles of a rotor to suppress torque fluctuations. The number of rotational buildup states which is a value obtained by dividing 360 degrees by a rotational buildup angle θs by which the core plates are rotated in units of a predetermined number of plates to be stacked, the number of magnetic poles which is the number of magnetic poles M of the rotor, and the number of fixation portions which is the number of fixation portions 5 are set such that the number of fixation portions is an integer number of times the number of rotational buildup states and at least common divisors of the number of fixation portions and the number of magnetic poles include "1" only or "1" or "2" only.

4 Claims, 6 Drawing Sheets

(51) Int. Cl.
*H02K 21/16* (2006.01)
*H02K 21/14* (2006.01)
*H02K 1/16* (2006.01)

(58) Field of Classification Search
USPC .... 310/216.001, 216.004, 216.008, 216.011, 310/216.012
See application file for complete search history.

(56) References Cited

U.S. PATENT DOCUMENTS

| | | |
|---|---|---|
| 6,300,700 B1 | 10/2001 | Nishiyama et al. |
| 6,356,001 B1 | 3/2002 | Nishiyama et al. |
| 6,369,480 B1 | 4/2002 | Nishiyama et al. |
| 6,759,778 B2 | 7/2004 | Nishiyama et al. |
| 2002/0036438 A1 | 3/2002 | Nishiyama et al. |
| 2004/0135454 A1* | 7/2004 | Takahashi ............... H02K 1/278 310/156.45 |
| 2004/0183393 A1 | 9/2004 | Suzuki et al. |
| 2005/0229384 A1* | 10/2005 | Yamamoto ............. H02K 15/02 29/598 |
| 2006/0273684 A1* | 12/2006 | Ishikawa ................ H02K 29/03 310/216.004 |
| 2006/0284511 A1* | 12/2006 | Evon ........................ H02K 9/14 310/216.004 |
| 2009/0108697 A1* | 4/2009 | Uetsuji ................ H02K 15/028 310/216.011 |
| 2009/0284096 A1* | 11/2009 | Katagiri ................ H02K 1/148 310/216.001 |
| 2010/0301695 A1 | 12/2010 | Yamada et al. |
| 2012/0326554 A1* | 12/2012 | Kinpara .................. H02K 1/16 310/216.004 |

FOREIGN PATENT DOCUMENTS

| | | |
|---|---|---|
| JP | 2002238193 A | 8/2002 |
| JP | 3550971 B2 | 8/2004 |
| JP | 2004304997 A | 10/2004 |
| JP | 2009213283 A | 9/2009 |
| JP | 2010263774 A | 11/2010 |

* cited by examiner

STATOR CORE FOR ROTARY ELECTRIC MACHINE

TECHNICAL FIELD

Embodiments disclosed herein relate to a stator core for a rotary electric machine formed by stacking a plurality of core plates.

BACKGROUND ART

A rotary electric machine is widely utilized as a power source for various devices. A common permanent-magnet AC rotary electric machine is configured to include a stator having a coil and a rotor having permanent magnets that serve as magnetic poles. In an inner-rotor rotary electric machine, in many cases, a stator core around which the coil is wound is formed by stacking a plurality of cores obtained by punching a magnetic steel sheet into an annular shape into a cylindrical shape. A plurality of core plates are fixed to each other so as not to be separated from each other. The core plates are fixed to each other by welding, bolting, caulking, or the like. Japanese Patent No. 3550971 (Patent Document 1) discloses a stator core in which core plates of a magnetic steel sheet are fixed to each other at fixation portions provided at a plurality of locations in the circumferential direction.

In providing such fixation portions, if welding grooves, bolt holes, or the like are formed in the core plates, the magnetic path in the stator core is accordingly reduced. In addition, in the case where the core plates are deformed by caulking, the magnetic properties may be varied by the deformation to reduce the effective magnetic path. Here, when the rotor having the permanent magnets relatively rotates with respect to the stator and magnetic flux passes through the fixation portions, torque of the rotor may be fluctuated in correspondence with the fixation portions. If the pitch angle of the fixation portions in the stator core is an integer number of times the pitch angle of the permanent magnets (the pitch angle of the magnetic poles) in the rotor, a plurality of magnetic poles pass through a plurality of fixation portions at the same time periodically, which increases torque fluctuations. Therefore, Patent Document 1 proposes setting an inter-fixation portion angle ($\alpha$) between the fixation portions to an angle that is not an integer number of times the pitch angle (A) of the magnetic poles (Patent Document 1; the third to tenth paragraphs etc.).

In addition, the thickness of the magnetic steel sheet as the material of the core plates is not completely uniform. Therefore, if the core plates are stacked in such an attitude that a reference direction determined with respect to the magnetic steel sheet is aligned in the same direction, errors in thickness of the magnetic steel sheet may be accumulated so that the total thickness of the plurality of core plates may significantly differ among positions in the circumferential direction of the stator core. Therefore, in general, rotational buildup in which the core plates are stacked while being rotated in the circumferential direction is performed to make the total thickness of the plurality of core plates uniform at various positions in the circumferential direction. A plurality of fixation portions is included in the range of rotational angle in the circumferential direction for rotational buildup. In Patent Document 1, such fixation portions are referred to as a fixation portion set. Then, the rotational angle in the circumferential direction for rotational buildup is referred to as an inter-fixation portion set angle ($\beta$). Patent Document 1 further proposes setting the inter-fixation portion set angle ($\beta$) to an angle that is not an integer number of times the pitch angle (A) of the magnetic poles (Patent Document 1; the eleventh paragraph etc.).

In order to fix the stator core, caulking which can shorten the lead time compared to welding and also can suppress the cost of manufacture is often applied. It should be noted, however, that caulking generally provides a small fastening force compared to welding. Therefore, it is necessary to set a large number of fixation portions compared to a case where welding is adopted. If the number of fixation portions is increased, the number of times when the magnetic poles and the fixation portions are arranged in one line along the radial direction of the rotary electric machine is also increased. Patent Document 1 provides countermeasures for a case where the number of fixation portions is smaller than the number of magnetic poles, and does not mention a case where the number of fixation portions is larger than the number of magnetic poles. In addition, Patent Document 1 prescribes the relationship between the pitch angle (A) of the magnetic poles and the inter-fixation portion angle ($\alpha$) and the relationship between the pitch angle (A) of the magnetic poles and the inter-fixation portion set angle ($\beta$), but does not necessarily quantitatively prescribe the comprehensive relationship among (A, $\alpha$, $\beta$). Thus, there is desired a technique that is widely applicable to a variety of types of rotary electric machines.

RELATED-ART DOCUMENTS

Patent Documents

[Patent Document 1] Japanese Patent No. 3550971

SUMMARY

Problem to be Solved

In view of the foregoing background, it is desirable to provide a technique capable of suppressing torque fluctuations caused in accordance with the relative positional relationship of a stator core for a rotary electric machine with magnetic poles provided in a rotor, the stator core being formed by stacking a plurality of core plates and fixing the core plates to each other.

Means for Solving the Problem

In view of the foregoing issue, disclosed embodiments provide a stator core for a rotary electric machine with a characteristic configuration, that is, a stator core for a rotary electric machine formed by stacking a plurality of core plates and fixing the plurality of core plates to each other at fixation portions provided at a plurality of locations in a circumferential direction to constitute a stator disposed so as to face a rotor in which magnetic poles are formed at equal intervals at a plurality of locations in the circumferential direction, in which:

the core plates are rotationally built up at a rotational buildup angle prescribed in advance in units of a number of plates to be stacked determined in advance;

a number of rotational buildup states which is a value obtained by dividing 360 degrees by the rotational buildup angle, a number of magnetic poles which is the number of the magnetic poles of the rotor, and a number of fixation portions which is the number of the fixation portions are set such that the number of fixation portions is an integer number of times the number of rotational buildup states and at least common divisors of the number of fixation portions and the number of magnetic poles include "1" only or "1" or "2" only; and in the case where the number of rotational buildup states is an even number, the number of rotational buildup states is smaller than the number of magnetic poles. The core plates being rotationally built up at a rotational buildup angle prescribed in advance in units of a number of plates to be stacked determined in advance indicate that the core plates are stacked as rotated in the circumferential direction in accordance with a rotational buildup angle prescribed in advance in units of a number of plates to be stacked determined in advance.

If the number of fixation portions is an integer number of times the number of rotational buildup states, the same number of fixation portions are included in the range of each rotational buildup angle. Thus, when the core plates are stacked with rotational buildup, the fixation portions can be disposed in the same arrangement in the circumferential direction in any rotational buildup state. In the case where common divisors of the number of fixation portions and the number of magnetic poles include "1" only, in addition, when one of the magnetic poles and one of the fixation portions are arranged along the radial direction of the rotary electric machine, none of the other magnetic poles and none of the other fixation portions are arranged along the radial direction. Thus, a plurality of magnetic poles do not pass through a plurality of fixation portions at the same time, which suppresses torque fluctuations. In the case where common divisors of the number of fixation portions and the number of magnetic poles include "1" and "2" only, meanwhile, when one of the magnetic poles and one of the fixation portions are arranged along the radial direction of the rotary electric machine, one of the other magnetic poles and one of the other fixation portions are arranged along the radial direction, but none of the rest of the magnetic poles and none of the rest of the fixation portions are arranged along the radial direction. Thus, three or more magnetic poles do not pass through three or more fixation portions at the same time, which suppresses torque fluctuations.

The magnetic poles are constituted by pairs of north poles and south poles, and thus the number of magnetic poles is an even number. Therefore, if the number of magnetic poles is equal to or less than the number of rotational buildup states in the case where the number of rotational buildup states is an even number, all the magnetic poles are positioned in the same phase in each range divided for each rotational buildup angle of the stator core. If the number of magnetic poles is larger than the number of rotational buildup states, on the other hand, some of the magnetic poles are positioned out of phase. According to the characteristic configuration, in the case where the number of rotational buildup states is an even number, the number of rotational buildup states is smaller than the number of magnetic poles. Thus, torque fluctuations can be suppressed. Thus, according to the characteristic configuration, it is possible to suppress torque fluctuations caused in accordance with the relative positional relationship of a stator core for a rotary electric machine with magnetic poles provided in a rotor, the stator core being formed by stacking a plurality of core plates and fixing the core plates to each other.

As discussed above, the number of magnetic poles is an even number. Here, if the number of rotational buildup states is an odd number, divisors of the number of rotational buildup states do not include "2". In addition, the number of fixation portions is an integer number of times the number of rotational buildup states. Thus, if the number of fixation portions is an odd number times the number of rotational buildup states, the number of fixation portions can be an odd number, and divisors of the number of fixation portions can be caused not to include "2". That is, in the case where the number of rotational buildup states is an odd number, common divisors of the number of magnetic poles and the number of fixation portions can be caused not to include "2". As a result, when one of the magnetic poles and one of the fixation portions are arranged along the radial direction of the rotary electric machine, none of the other magnetic poles and none of the other fixation portions are arranged along the radial direction, which suppresses torque fluctuations. That is, in the stator core for a rotary electric machine according to one preferred embodiment, in the case where the number of rotational buildup states is an odd number, common divisors of the number of fixation portions and the number of magnetic poles is preferably set to include "1" only.

If the number of magnetic poles is an integer number of times the number of rotational buildup states, the magnetic poles are positioned in the same state in the positional relationship in the circumferential direction in each range divided for each rotational buildup angle of the stator core. The arrangement of the fixation portions in each divided range is the same in consideration of rotational buildup. Thus, the magnetic poles and the fixation portions correspond to each other in the same relative positional relationship in the circumferential direction in each range. For example, in the case where one of the fixation portions and one of the magnetic poles are arranged along the radial direction of the rotary electric machine in one of the divided ranges, the fixation portions and the magnetic poles are arranged along the radial direction also in the other divided ranges. That is, the fixation portions and the magnetic poles are arranged along the radial direction at a plurality of locations at the same time, which increases torque fluctuations. Thus, the number of magnetic poles is preferably not an integer number of times the number of rotational buildup states. In the stator core for a rotary electric machine according to one preferred embodiment, the number of rotational buildup states is preferably set to a value that is different from divisors of the number of magnetic poles.

BEST MODES

Figure 1:
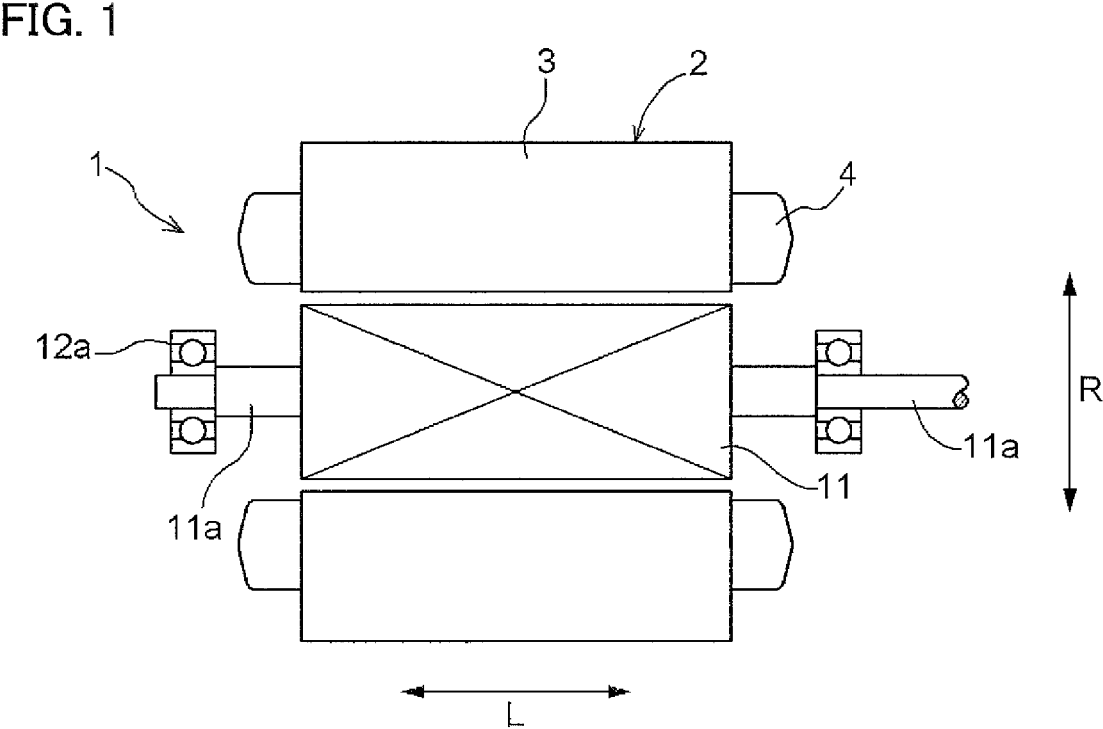
FIG. 1 is an axial sectional view schematically illustrating the structure of a rotary electric machine.

An exemplary embodiment will be described below with reference to the drawings. FIG. 1 is an axial sectional view schematically illustrating the structure of a rotary electric machine 1. The rotary electric machine 1 is a synchronous machine (a synchronous motor, a synchronous generator) that functions as a three-phase AC motor or a three-phase AC generator. As illustrated in FIG. 1, the rotary electric machine 1 according to the embodiment is configured to include a stator 2 and a rotor 11. The stator 2 which constitutes an armature of the rotary electric machine 1 is fixed to the inner peripheral surface of a case (not illustrated). The rotor 11 which serves as a field including permanent magnets is disposed on the inner side of the stator 2 in a radial direction R so as to be relatively rotatable with respect to the stator 2. A rotary shaft 11a of the rotor 11 is rotatably held by the case (not illustrated) via a bearing 12a.

Figure 2:
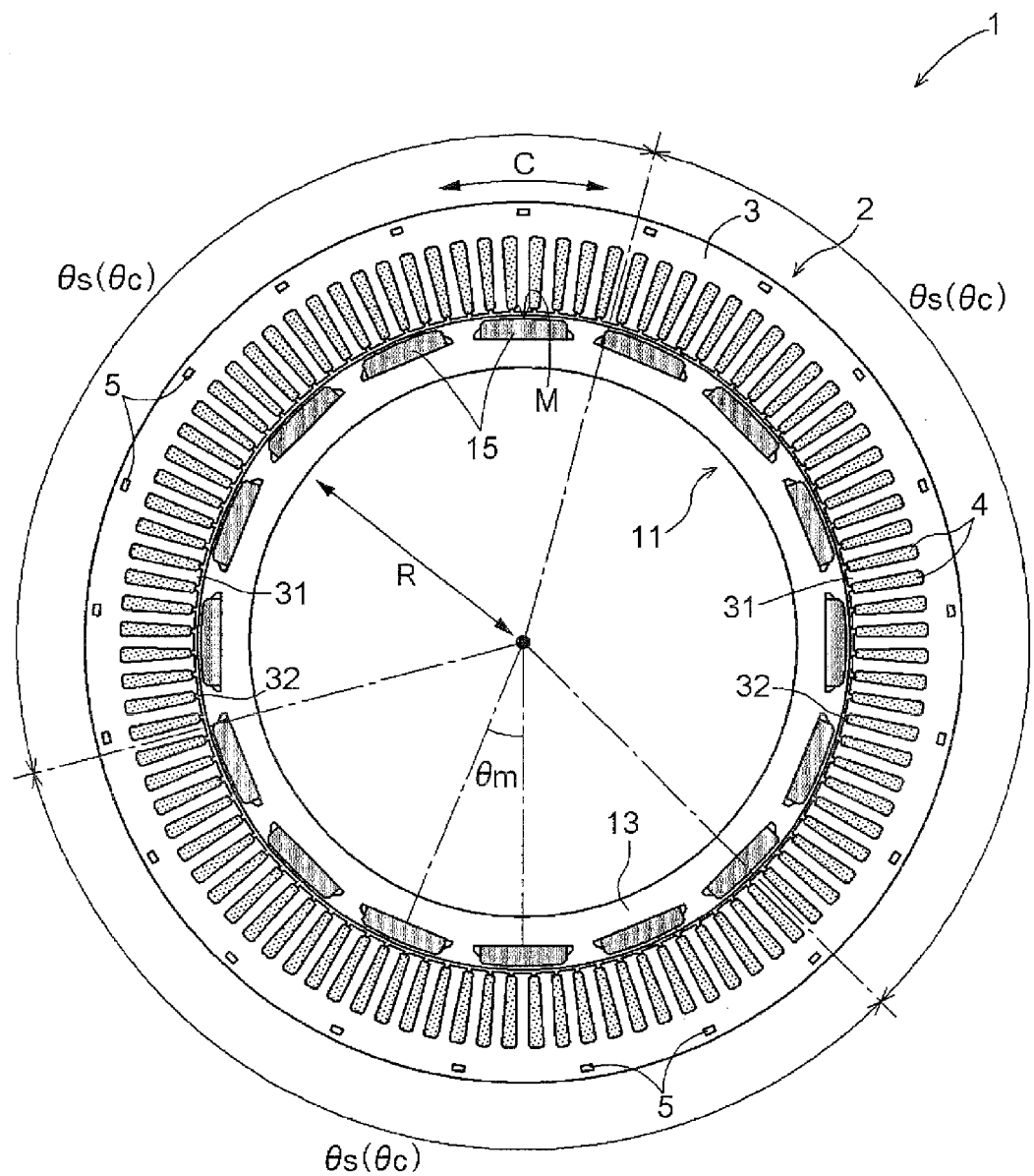
FIG. 2 is a schematic cross-sectional view of the rotary electric machine illustrating a first specific example of the configuration of a stator core.

As illustrated in the cross-sectional view of FIG. 2, the stator 2 is configured to include a stator core 3 and a coil 4. Teeth 31 are formed on the inner peripheral surface of the stator core 3 at predetermined intervals. The coil 4 is constituted by winding a conductor around the teeth 31 a plurality of times. The coil 4 is configured to include a pair of coil side portions formed to extend straight along an axial direction L, and coil end portions that connect between the pair of coil side portions. The coil side portions are housed in slots 32 formed between adjacent teeth 31 of the stator core 3. The stator core 3 is formed by stacking a plurality of annular core plates constituted of a magnetic steel sheet into a cylindrical shape, and fixing the core plates to each other.

The rotor 11 is configured to include a rotor core 13 and permanent magnets 15 embedded in the rotor core 13. The rotor core 13 is also formed by stacking a plurality of circular or annular core plates constituted of a magnetic steel sheet into a columnar or cylindrical shape, and fixing the core plates to each other. The permanent magnets 15 forming magnetic poles M are embedded at a plurality of locations in the circumferential direction of the rotor core 13 at equal intervals. Consequently, the magnetic poles M are formed at equal intervals at a plurality of locations in the circumferential direction C of the rotor 11. The permanent magnets 15 are disposed at a magnetic pole pitch angle $\theta m$ [degrees] in the circumferential direction of the rotor core 13. That is, the rotor 11 is formed with a number F (=360/$\theta m$) of magnetic poles M.

The thickness of the magnetic steel sheet as the material of the core plates forming the stator core 3 and the rotor core 13 is not completely uniform. Thus, if the core plates are stacked in an attitude in which the core plates are aligned with a reference direction which is determined with respect to the magnetic steel sheet (in the same orientation), errors in thickness of the magnetic steel sheet may be accumulated so that the total thickness of the plurality of core plates in the stacking direction (axial direction L) may significantly differ among positions in the circumferential direction C of the stator core 3. Therefore, in general, rotational buildup in which the core plates are stacked while being rotated in the circumferential direction C is performed to make the total thickness uniform. The core plates are stacked while being rotated in the circumferential direction C in accordance with an angle (rotational buildup angle $\theta c$) prescribed in advance in units of a number of plates to be stacked determined in advance.

For example, in the case where the core is generated by stacking 36 core plates and the rotational buildup angle $\theta c$ is 120 [degrees], a value "3" obtained by dividing 360 degrees by the rotational buildup angle $\theta c$ (=120 [degrees]) is used as a number of rotational buildup states E. Then, a value "12" obtained by dividing the total number of stacked plates "36" by the number of rotational buildup states E (=3) is determined as a number of stacked plates determined in advance, and the core is formed as follows. First, 12 core plates are stacked in the same attitude to form a first core plate group. Next, after the first core plate group is rotated by the rotational buildup angle $\theta c$, 12 core plates are additionally stacked on the first core plate group to form a second core plate group. Further, after the second core plate group is rotated in the same direction by the rotational buildup angle $\theta c$, 12 core plates are additionally stacked on the second core plate group to form a third core plate group. The thus stacked 36 core plates of the third core plate group are fixed to each other to form the core. The total rotational angle of the stacked core plate group, specifically the first core plate group which is stacked first, is "360−$\theta c$ [degrees]".

In the example described above, when the number of rotational buildup states E is "3", the number of stacked plates is "12". However, the total rotational angle of the first core plate group is not necessarily "360−$\theta c$ [degrees]", and may be "720−$\theta c$ [degrees]" or "1080−$\theta c$ [degrees]". For example, in the case where the total rotational angle of the first core plate group is "720−$\theta c$ [degrees]", the number of plates to be stacked each time may be determined as six, and the core may be formed as follows: first stacking→rotation by $\theta c$→second stacking→rotation by $\theta c$→third stacking→rotation by $\theta c$→fourth stacking→rotation by $\theta c$→fifth stacking→rotation by $\theta c$→sixth stacking. Further, the number of plates to be stacked each time may be determined as one, and stacking may be performed up to the thirty sixth stacking (in this case, the total rotational angle is "360×36/3−$\theta c$ [degrees]").

As a matter of course, it is not necessary that the rotational buildup angle of the stator core 3 and the rotational buildup angle of the rotor core 13 should be the same as each other. In FIG. 2, the rotational buildup angle $\theta s$ of the stator core 3 is illustrated as the rotational buildup angle $\theta c$. As is clear from the example of the 36 stacked plates discussed above, the number of rotational buildups during stacking may be a variety of values such as 2, 5, 8, 11, . . . , 32, and 35 in accordance with the number of plates stacked in the same state. However, the type of the attitude during stacking with respect to the attitude (phase, orientation) at the time when the core plates are punched is constant in accordance with the rotational buildup angle. In other words, the type of the attitude of the core plates in the rotational direction with respect to a reference direction which is determined with respect to the magnetic steel sheet which is the material of the core plates is constant in accordance with the rotational buildup angle. As discussed above, in the case where the rotational buildup angle $\theta c$ is 120 [degrees], there are three states, and thus the value "3" is used as the number of rotational buildup states E. Then, the number of rotational buildups during stacking is determined as "E×n−1" with n being a natural number in the range of "total number of stacked plates/number of rotational buildup states E".

Thus, in the core plate group in which the total thickness of the plurality of core plates at each position in the circumferential direction C has been made uniform, in other words, the core plate group stacked such that the length in the axial direction L at each position in the circumferential direction C has been made substantially uniform, the plurality of core plates are fixed to each other to constitute the stator core 3 or the rotor core 13.

A method of fixing the stator core 3 will be described below. In the embodiment, each core plate is provided with fixation portions 5 including recessed portions formed in one surface and projecting portions formed on the other surface. The projecting portions of the fixation portions 5 are projections for caulking, and the recessed portions are engagement portions for engagement with the projections for caulking. When the core plates are stacked, the projecting portions are inserted into the recessed portions of the fixation portions 5 of the core plates stacked in the up-down direction (axial direction L). When a pressing force is applied in the up-down direction (axial direction L), the projecting portions are engaged with the recessed portions so that the core plates are fixed to each other. In the embodiment, the core plates are fixed to each other through such "dowel caulking" to constitute the stator core 3.

Although the core plates may be fixed to each other through welding or the like, caulking which can shorten the lead time compared to welding and also can suppress the cost of manufacture is applied in the embodiment. It should be noted, however, that caulking generally provides a small fastening force compared to welding. Therefore, it is necessary to set a large number of fixation portions compared to a case where welding is adopted. Also in the embodiment, as illustrated in FIG. 2, a number of fixation portions 5 formed in the stator 2 is larger than that of the magnetic poles M formed in the rotor 11 (21 fixation portions 5 with respect to 16 magnetic poles M).

Providing such fixation portions 5 accordingly reduces the magnetic path in the stator core 3. Here, when the rotor 11 having the permanent magnets 15 relatively rotates with respect to the stator 2 and magnetic flux passes through the fixation portions 5, torque of the rotor 11 may be fluctuated. When magnetic flux from a plurality of magnetic poles M passes through the fixation portions 5 at the same time, torque fluctuations also become larger. The number of magnetic poles M is determined by the specifications required for the rotary electric machine 1. Thus, such torque fluctuations are preferably suppressed by appropriately setting the number and the arrangement of the fixation portions 5.

Here, the number and the arrangement of the fixation portions 5 are prescribed in consideration of the relationship among the number of rotational buildup states E which is a value obtained by dividing 360 [degrees] by the rotational buildup angle θs (θc), the number of magnetic poles F which is the number of magnetic poles M of the rotor 11, and the number of fixation portions G which is the number of fixation portions 5 in cross section (the number of fixation portions 5 formed in the core plates). Specifically, the number and the arrangement of the fixation portions 5 are prescribed such that the number of fixation portions G is an integer number of times the number of rotational buildup states E, and at least common divisors of the number of fixation portions G and the number of magnetic poles F include "1" only or "1" and "2" only.

FIG. 2 illustrates a first specific example according to such prescriptions.

In the rotary electric machine 1 illustrated in FIG. 2, the rotational buildup angle θs of the stator core 3 is 120 [degrees], and the number of rotational buildup states E is "3". The number of magnetic poles F of the rotor 11 is "16". The number of fixation portions G is set to be an integer number of times the number of rotational buildup states E, and at least common divisors of the number of fixation portions G and the number of magnetic poles F are set to include "1" only. Specifically, as illustrated in FIG. 2, the number of fixation portions G is "21", and common divisors of the number of fixation portions G (=21) and the number of magnetic poles F (=16) include "1" only.

Thus, the number of fixation portions G (=21) is an integer number of times the number of rotational buildup states E (=3), and the number of fixation portions 5 included in the range of each rotational buildup angle θs (=120 [degrees]) is all "7". Thus, the fixation portions 5 can be maintained in the same arrangement in the circumferential direction in any rotational buildup state when the core plates are stacked with rotational buildup. In addition, common divisors of the number of fixation portions G (=21) and the number of magnetic poles F (=16) include "1" only. Thus, when one of the magnetic poles M (the center of the permanent magnet 15) and one of the fixation portions 5 are arranged along the radial direction R of the rotary electric machine 1, none of the other magnetic poles M and none of the other fixation portions 5 are arranged along the radial direction R. That is, magnetic flux from a plurality of magnetic poles M does not pass through a plurality of fixation portions 5 at the same time electrically in the same phase. Thus, torque fluctuations can be suppressed.

Figure 3:
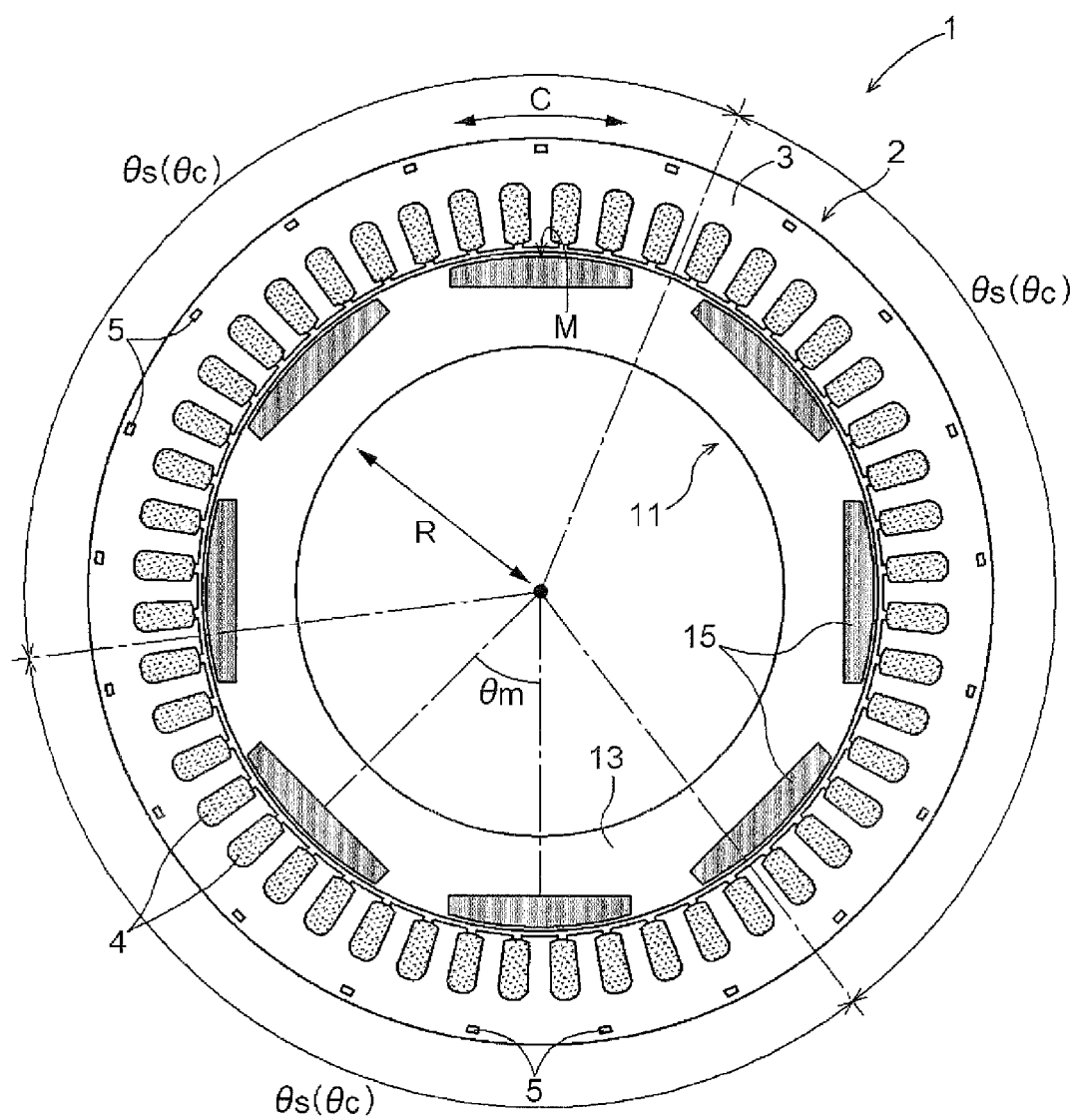
FIG. 3 is a schematic cross-sectional view of the rotary electric machine illustrating a second specific example of the configuration of the stator core.

FIG. 3 illustrates a second specific example for the number and the arrangement of the fixation portions 5. In the rotary electric machine 1 illustrated in FIG. 3, the rotational buildup angle θs of the stator core 3 is 120 [degrees], and the number of rotational buildup states E is "3". The number of magnetic poles F of the rotor 11 is "8". The number of fixation portions G is set to be an integer number of times the number of rotational buildup states E, and at least common divisors of the number of fixation portions G and the number of magnetic poles F are set to include "1" only. Specifically, as illustrated in FIG. 3, the number of fixation portions G is "21", and common divisors of the number of fixation portions G (=21) and the number of magnetic poles F (=8) include "1" only.

As in the first specific example, the number of fixation portions G (=21) is an integer number of times the number of rotational buildup states E (=3), and the number of fixation portions 5 included in the range of each rotational buildup angle θs (=120 [degrees]) is all "7". Thus, as in the first specific example, the fixation portions 5 can be maintained in the same arrangement in the circumferential direction in any rotational buildup state when the core plates are stacked with rotational buildup. In addition, common divisors of the number of fixation portions G (=21) and the number of magnetic poles F (=8) include "1" only. Thus, as in the first specific example, when one of the magnetic poles M and one of the fixation portions 5 are arranged along the radial direction R of the rotary electric machine 1, none of the other magnetic poles M and none of the other fixation portions 5 are arranged along the radial direction R. That is, magnetic flux from a plurality of magnetic poles M does not pass through a plurality of fixation portions 5 at the same time electrically in the same phase. Thus, torque fluctuations can be suppressed.

Figure 4:
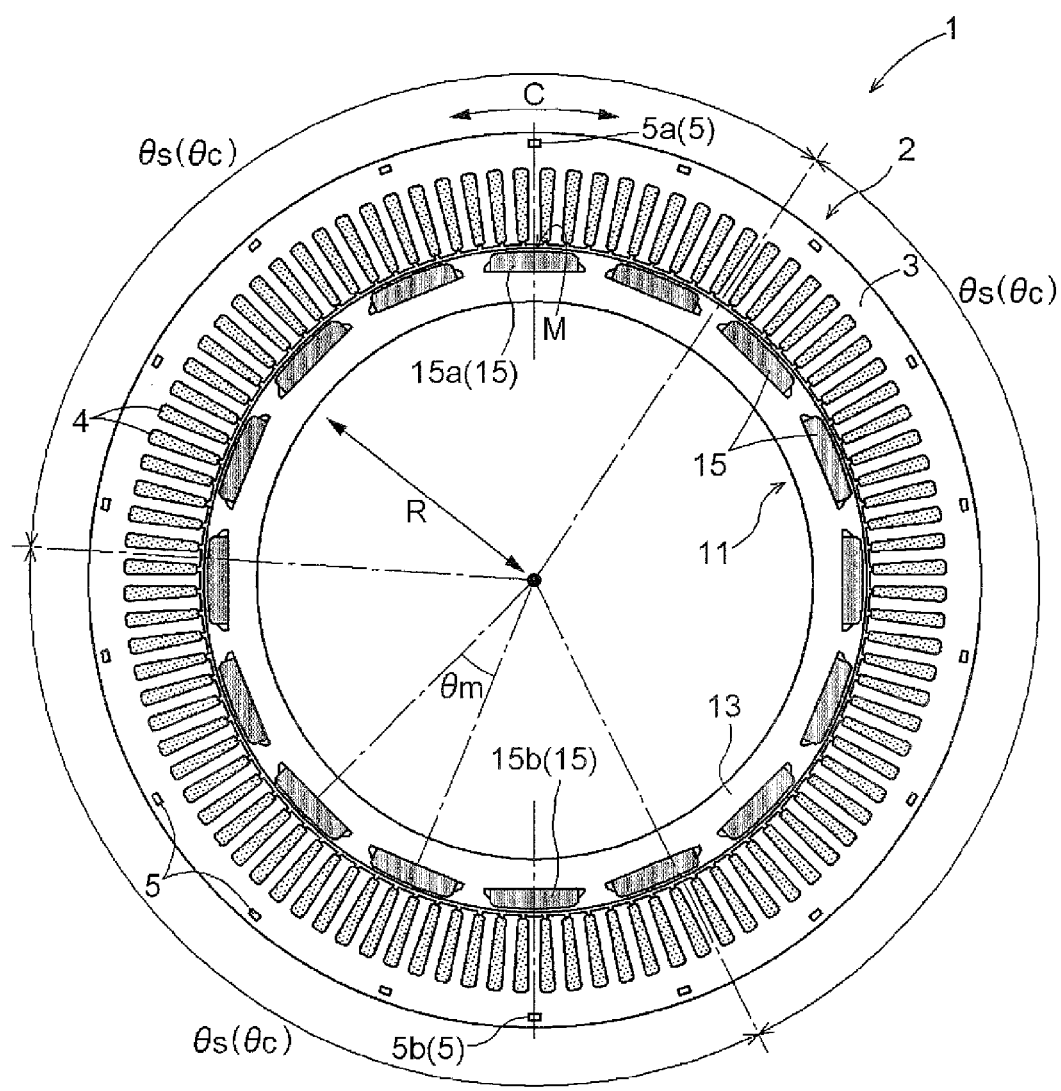
FIG. 4 is a schematic cross-sectional view of the rotary electric machine illustrating a third specific example of the configuration of the stator core.

FIG. 4 illustrates a third specific example for the number and the arrangement of the fixation portions 5. In the rotary electric machine 1 illustrated in FIG. 4, the rotational buildup angle θs of the stator core 3 is 120 [degrees], and the number of rotational buildup states E is "3". The number of magnetic poles F of the rotor 11 is "16" as in the first specific example. The number of fixation portions G is "18" unlike the first specific example and the second specific example, and common divisors of the number of fixation portions G (=18) and the number of magnetic poles F (=16) include "1" and "2". In the third specific example, the number of fixation portions G is set so as to be an integer number of times the number of rotational buildup states E, and such that at least common divisors of the number of fixation portions G and the number of magnetic poles F include "1" and "2" only.

As in the first and second specific examples, the number of fixation portions G (=18) is an integer number of times the number of rotational buildup states E (=3), and the number of fixation portions 5 included in the range of each rotational buildup angle θs (=120 [degrees]) is all "6". Thus, as in the first and specific examples, the fixation portions 5 can be maintained in the same arrangement in the circumferential direction in any rotational buildup state when the core plates are stacked with rotational buildup. In the third specific example, common divisors of the number of fixation portions G (=18) and the number of magnetic poles F (=16) include "1" and "2" only. In the case where common divisors of the number of fixation portions G and the number of magnetic poles F include "1" and "2" only, when one of the magnetic poles M and one of the fixation portions 5 are arranged along the radial direction R of the rotary electric machine 1, one of the other magnetic poles M and one of the other fixation portions 5 are also arranged along the radial direction R. However, the rest of the magnetic poles M and the rest of the fixation portions 5 are not arranged along the radial direction R.

For example, in the case where the center of the permanent magnet 15 indicated by symbol "15a" and the fixation portion 5 indicated by symbol "5a" are arranged along the radial direction R in FIG. 4, the center of the permanent magnet 15 indicated by symbol "15b" and the fixation portion 5 indicated by symbol "5b" are similarly arranged along the radial direction R. However, the center of none of the rest of the magnetic poles M and none of the rest of the fixation portions 5 are arranged along the radial direction R. That is, in the third specific example, magnetic flux from three or more magnetic poles M does not pass through three or more fixation portions 5 at the same time electrically in the same phase. Thus, torque fluctuations can be suppressed.

Figure 5:
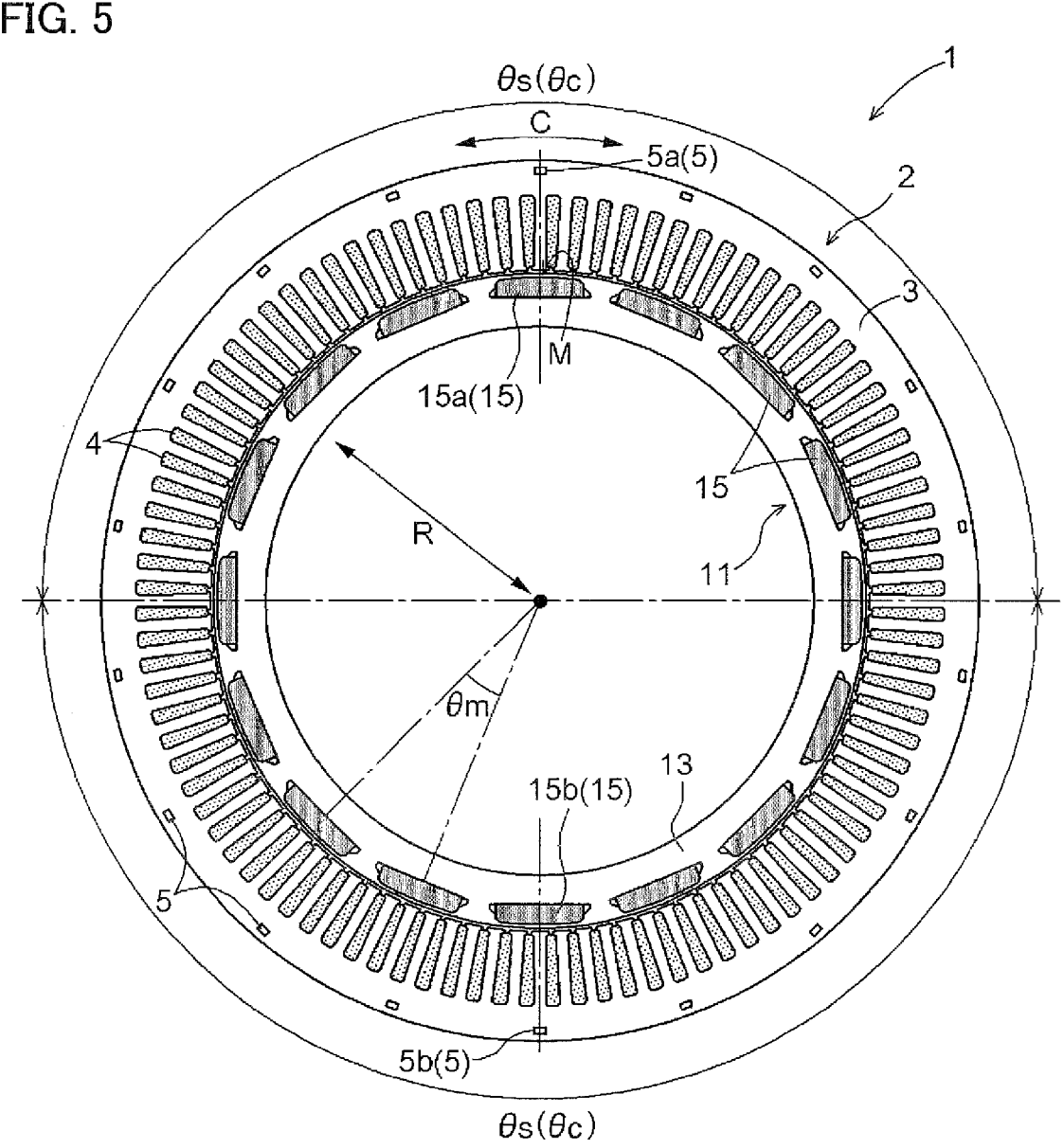
FIG. 5 is a schematic cross-sectional view of the rotary electric machine illustrating a fourth specific example of the configuration of the stator core.

FIG. 5 illustrates a fourth specific example for the number and the arrangement of the fixation portions 5. In the rotary electric machine 1 illustrated in FIG. 5, the rotational buildup angle θs of the stator core 3 is 180 [degrees] unlike the first to third specific examples. Thus, the number of rotational buildup states E is "2". The number of magnetic poles F of the rotor 11 is "16" as in the first and third specific examples. As in the third specific example, the number of fixation portions G is set to "18" so as to be an integer number of times the number of rotational buildup states E, and such that at least common divisors of the number of fixation portions G and the number of magnetic poles F include "1" and "2" only.

As in the first to third specific examples, the number of fixation portions G (=18) is an integer number of times the number of rotational buildup states E (=2), and the number of fixation portions 5 included in the range of each rotational buildup angle θs (=180 [degrees]) is all "9". Thus, as in the first to third specific examples, the fixation portions 5 can be maintained in the same arrangement in the circumferential direction in any rotational buildup state when the core plates are stacked with rotational buildup. In addition, common divisors of the number of fixation portions G (=18) and the number of magnetic poles F (=16) include "1" and "2" only. Thus, when one of the magnetic poles M and one of the fixation portions 5 are arranged in the radial direction R of the rotary electric machine 1, one of the other magnetic poles M and one of the other fixation portions 5 are arranged in the radial direction R, but none of the rest of the magnetic poles M and none of the rest of the fixation portions 5 are arranged along the radial direction R.

As in FIG. 4, in the case where the center of the permanent magnet 15 indicated by symbol "15a" and the fixation portion 5 indicated by symbol "5a" are arranged along the radial direction R in FIG. 5, the center of the permanent magnet 15 indicated by symbol "15b" and the fixation portion 5 indicated by symbol "5b" are similarly arranged along the radial direction R. However, the center of none of the rest of the magnetic poles M and none of the rest of the fixation portions 5 are arranged along the radial direction R. That is, in the fourth specific example, magnetic flux from three or more magnetic poles M does not pass through three or more fixation portions 5 at the same time electrically in the same phase. Thus, torque fluctuations can be suppressed.

In the case where the number of rotational buildup states E is an even number as in the fourth specific example, it is necessary that the number of rotational buildup states E should be smaller than the number of magnetic poles F. The magnetic poles M are constituted by pairs of north poles and south poles, and thus the number of magnetic poles F is an even number. Therefore, if the number of magnetic poles F is equal to or less than the number of rotational buildup states E in the case where the number of rotational buildup states E is an even number, all the magnetic poles M are positioned in the same phase in each range of the stator core 3 divided for each rotational buildup angle θs. For example, if the number of rotational buildup states E is "2" and the number of magnetic poles F is "2", when one of the magnetic poles M and one of the fixation portions 5 are arranged along the radial direction R of the rotary electric machine 1, the remaining one of the magnetic poles M and the remaining one of the fixation portions 5 are also arranged along the radial direction R. That is, if the number of magnetic poles F is "2", all the magnetic poles M are in the same relative phase with the fixation portions 5 in the radial direction R. If the number of magnetic poles F is larger than the number of rotational buildup states E, on the other hand, some of the magnetic poles M are positioned out of phase. Thus, in the case where the number of rotational buildup states E is an even number as in the fourth specific example, it is also necessary that the number of rotational buildup states E should be smaller than the number of magnetic poles F. The number of magnetic poles F is an even number. Thus, in the case where the number of rotational buildup states E is an odd number, it is not necessary to consider the magnitude relationship between the number of rotational buildup states E and the number of magnetic poles F.

In the case where the number of rotational buildup states E is an even number, the same number of fixation portions 5 are included in the range of each rotational buildup angle θs. Therefore, the total number of fixation portions 5 is also an even number. The number of magnetic poles F is necessarily an even number. Thus, the number of magnetic poles F and the number of fixation portions G are both even numbers, and common divisors of the number of magnetic poles F and the number of fixation portions G necessarily include "2". For example, as in the fourth specific example, the number of magnetic poles F is "16", the number of fixation portions G is "18", and common divisors of the number of magnetic poles F and the number of fixation portions G include "1" and "2".

In the case where the number of rotational buildup states E is an odd number as in the first to third specific examples discussed above, on the other hand, the total number of fixation portions 5 may be either an odd number or an even number. That is, the number of fixation portions G is an odd number in the case where an odd number of fixation portions 5 is included in the range of each rotational buildup angle θs, and the number of fixation portions G is an even number in the case where an even number of fixation portions 5 is included in such a range. The number of magnetic poles F is necessarily an even number. Thus, in the case where the number of rotational buildup states E is an odd number, common divisors of the number of magnetic poles F and the number of fixation portions G include "1" only in some cases, and "1" and "2" only in the other cases. In the first and second specific examples discussed above, the number of fixation portions G is "21", which is an odd number. In the third specific example, the number of fixation portions G is "18", which is an even number.

As described already, a chance that the magnetic poles M and the fixation portions 5 are arranged in the radial direction R of the rotary electric machine 1 at the same time can be suppressed in the case where common divisors of the number of magnetic poles F and the number of fixation portions G include "1" only compared to a case where such common divisors include "2". The number of magnetic poles F is necessarily an even number. Thus, the number of fixation portions G is preferably an odd number. As discussed above, in the case where the number of rotational buildup states E is an odd number, the number of fixation portions G may be an odd number. Thus, in the case where the number of rotational buildup states E is an odd number as indicated in the first and second specific examples, the number of fixation portions G is preferably set to an odd number such that common divisors of the number of fixation portions G and the number of magnetic poles F include "1" only.

In the description of the relationship between the number of rotational buildup states E and the number of magnetic poles F, in the case where the number of rotational buildup states E is an even number, the number of fixation portions G is also an even number, and common divisors of the number of fixation portions G and the number of magnetic poles F which is an even number include "2". The number of rotational buildup states E and the number of magnetic poles F having a common divisor other than "1" means that a plurality of magnetic poles M and a plurality of fixation portions 5 may be arranged along the radial direction R at the same time. In the case where common divisors of the number of fixation portions G and the number of magnetic poles F include "2", at least two magnetic poles M and two fixation portions 5 may be arranged along the radial direction R at the same time.

In the first to third specific examples discussed above, the number of rotational buildup states E is "3", the number of magnetic poles F is "16" or "8", and thus common divisors of the number of rotational buildup states E and the number of magnetic poles F include "1" only. In the fourth specific example, the number of rotational buildup states E is "2", the number of magnetic poles F is "16", and thus common divisors of the number of rotational buildup states E and the number of magnetic poles F include not only "1" but also "2". Therefore, in the case of the fourth specific example, the number of fixation portions G is an even number, and common divisors of the number of fixation portions G and the number of magnetic poles F also include "2". In the first to third specific examples, on the other hand, the number of fixation portions G may be either an odd number or an even number. That is, the number of fixation portions G may be set to an odd number so that common divisors of the number of fixation portions G and the number of magnetic poles F include "1" only as in the first and second specific examples.

The number of fixation portions G is an integer number of times the number of rotational buildup states E, and thus divisors of the number of fixation portions G include the number of rotational buildup states E. As discussed above, common divisors of the number of fixation portions G and the number of magnetic poles F preferably include "1" only, rather than "1" and "2" only. Thus, the number of rotational buildup states E is preferably set to a value that is different from divisors of the number of magnetic poles F. In other words, the number of magnetic poles F is preferably not an integer number of times the number of rotational buildup states E.

OTHER EMBODIMENTS

Other embodiments will be described below. The configuration of each embodiment described below is not limited to its independent application, and may be applied in combination with the configuration of other embodiments unless any contradiction occurs.

Figure 6:
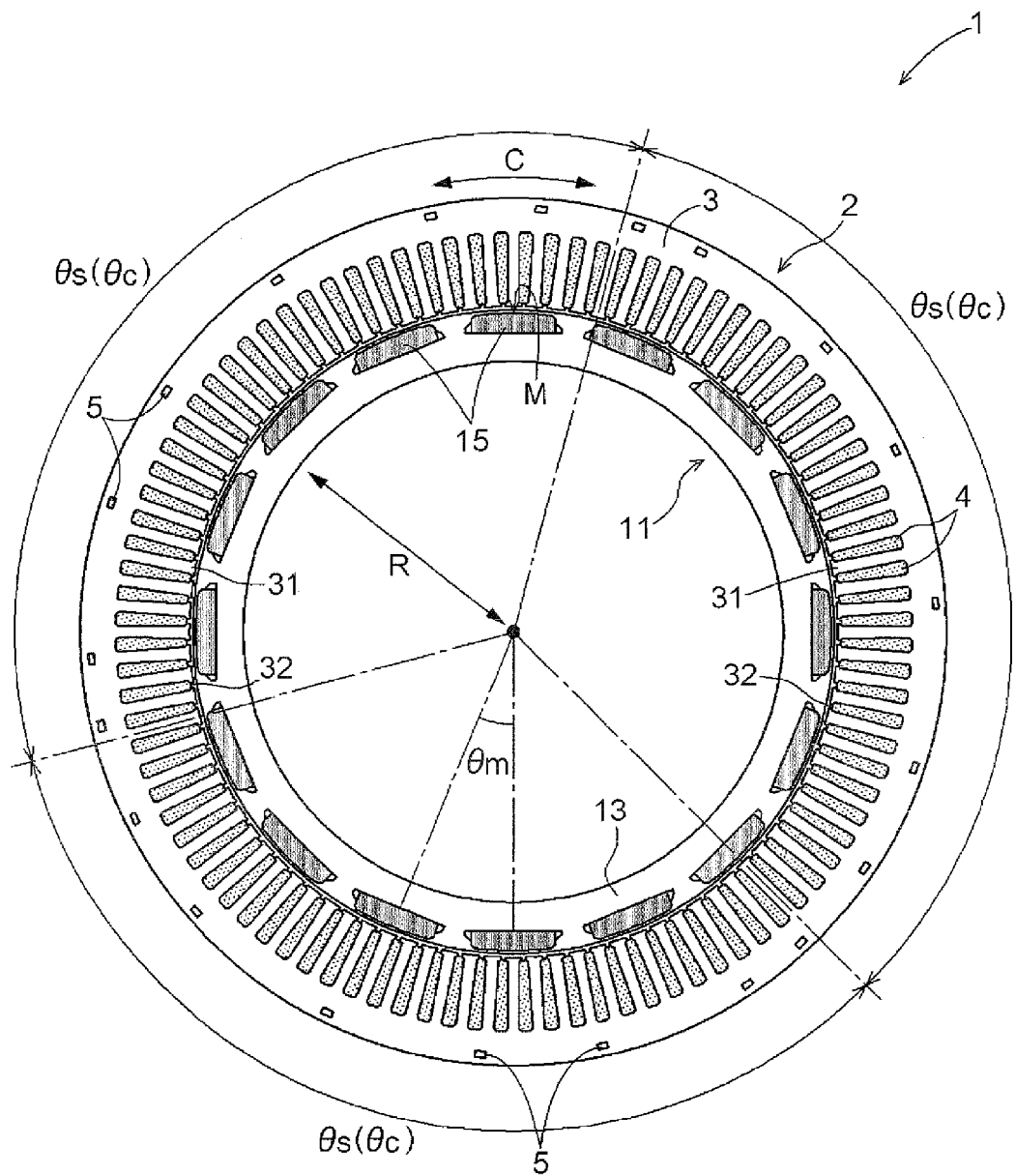
FIG. 6 is a schematic cross-sectional view of the rotary electric machine illustrating a fifth specific example of the configuration of the stator core.

(1) In the first to fourth specific examples described with reference to FIGS. 2 to 5, the fixation portions 5 are disposed at an equal pitch (at equal angles). However, the fixation portions 5 may not be arranged at an equal pitch as illustrated in a fifth specific example of FIG. 6 if the arrangement of the fixation portions 5 in the range corresponding to each rotational buildup angle θs is the same. The fifth specific example of FIG. 6 is a modification of the first specific example illustrated in FIG. 2.

(2) In the first to fifth specific examples, the number of rotational buildup states E is "2" or "3". However, the number of rotational buildup states E may be set to a value that is larger than "3" such as "4", "5", and "6". In the case where the number of rotational buildup states E is "4", "5", and "6", the rotational buildup angle θs (θc) is "90 [degrees]", "72 [degrees]", and "60 [degrees]", respectively.

(3) In the first to fifth specific examples, the number of magnetic poles F is "16" or "8". As a matter of course, however, the present invention may be applied to a case where the number of magnetic poles F is any other even number. It should be noted, however, that the present invention may be applied to a case where the number of magnetic poles F is larger than the number of rotational buildup states E in the case where the number of rotational buildup states E is an even number as discussed above.

INDUSTRIAL APPLICABILITY

The present invention may be applied to a stator core for a rotary electric machine formed by stacking a plurality of core plates. In addition, the present invention may be applied to a rotary electric machine including such a stator core.

DESCRIPTION OF THE REFERENCE NUMERALS

θc, θs ROTATIONAL BUILDUP ANGLE
1 ROTARY ELECTRIC MACHINE
2 STATOR
3 STATOR CORE
5 FIXATION PORTION
11 ROTOR
C CIRCUMFERENTIAL DIRECTION
E NUMBER OF ROTATIONAL BUILDUP STATES
F NUMBER OF MAGNETIC POLES
G NUMBER OF FIXATION PORTIONS
L AXIAL DIRECTION
M MAGNETIC POLE
R RADIAL DIRECTION

The invention claimed is:

1. A stator core comprising:

a plurality of core plates fixed at fixation portions provided at a plurality of locations in a circumferential direction to constitute a stator, the core plate are configured to face a rotor in which magnetic poles are formed at equal intervals at a plurality of locations in the circumferential direction;

the core plates are rotationally built up at a rotational buildup angle prescribed in advance in units of a number of plates to be stacked determined in advance;

a number of rotational buildup states, which is a value obtained by dividing 360 degrees by the rotational buildup angle, a number of magnetic poles which is the number of the magnetic poles of the rotor, and a number of fixation portions which is the number of the fixation portions are set such that the number of fixation portions is an integer number of times the number of rotational buildup states and at least common divisors of the number of fixation portions and the number of magnetic poles include "1" only or "1" or "2" only; and in the case where the number of rotational buildup states is an even number, the number of rotational buildup states is smaller than the number of magnetic poles.

2. The stator core for a rotary electric machine according to claim 1, wherein in the case where the number of rotational buildup states is an odd number, common divisors of the number of fixation portions and the number of magnetic poles is set to include "1" only.

3. The stator core for a rotary electric machine according to claim 1, wherein the number of rotational buildup states is set to a value that is different from divisors of the number of magnetic poles.

4. The stator core for a rotary electric machine according to claim 2, wherein the number of rotational buildup states is set to a value that is different from divisors of the number of magnetic poles.

* * * * *